US006760953B2

(12) United States Patent  (10) Patent No.: US 6,760,953 B2
Ben-Meir  (45) Date of Patent: Jul. 13, 2004

(54) CASTER ASSEMBLY

(75) Inventor: Ilan Ben-Meir, Haifa (IL)

(73) Assignee: Practima Ltd., Nesher (IL)

( * ) Notice: Subject to any disclaimer, the term of this patent is extended or adjusted under 35 U.S.C. 154(b) by 14 days.

(21) Appl. No.: 10/150,486

(22) Filed: May 20, 2002

(65) Prior Publication Data

US 2002/0189050 A1 Dec. 19, 2002

Related U.S. Application Data

(63) Continuation-in-part of application No. PCT/IL00/00748, filed on Nov. 15, 2000.

(30) Foreign Application Priority Data

Nov. 21, 1999 (IL) ................................................ 133062
Feb. 6, 2000 (IL) ................................................ 134399
Aug. 20, 2001 (IL) ................................................ 144980

(51) Int. Cl.[7] .............................................. B60B 33/00
(52) U.S. Cl. ........................... 16/18 R; 16/35 R; 16/44
(58) Field of Search .............................. 14/18 R, 35 R, 14/44, 30, 23, 19

(56) References Cited

U.S. PATENT DOCUMENTS

| 314,958 A | 3/1885 | Medenhall |
| 743,552 A | 11/1903 | Owens |
| 1,645,831 A | * 10/1927 | Tiedemann ..................... 16/23 |
| 2,688,149 A | * 9/1954 | Popp .......................... 16/18 R |
| 4,254,532 A | 3/1981 | Hager |
| 4,377,883 A | 3/1983 | Folson |
| 4,447,932 A | * 5/1984 | Mueller ......................... 16/21 |
| 4,509,227 A | 4/1985 | Keane |

FOREIGN PATENT DOCUMENTS

WO  WO 01/38201 A2  5/2001

* cited by examiner

Primary Examiner—Anthony Knight
Assistant Examiner—E Peavey
(74) Attorney, Agent, or Firm—Browdy and Neimark

(57) ABSTRACT

A castor assembly for supporting a load such as an article of furniture so that it can easily be moved in any desired direction. The assembly includes a load-bearing base member from which a vertical axle is projected. Pivoted on this axle is a swivel frame, while mounted below the frame on a horizontal axle is a ground-engaging caster wheel. Also mounted on the swivel frame is at least one support roller which engages the base member. The position of the roller on the swivel frame is such as to minimize the moment of force developed between the vertical axle and the caster wheel, thereby protecting the assembly from the adverse effects of excessive loads and impact forces.

15 Claims, 6 Drawing Sheets

CASTER ASSEMBLY

BACKGROUND OF THE INVENTION

1. Field of the Invention

This invention relates generally to caster assemblies for the support and movement of articles of furniture, as well as factory and baggage trucks, portable equipment and the like. In particular, the invention relates to a caster assembly which is capable of supporting heavy loads without becoming impaired and having a high resistance to shock forces.

2. Status of Prior Art

A caster assembly is composed of one or more wheels mounted on a swivel frame for the support and movement of the article such as a movable cart, trolley or gurney on which the assembly is installed. In a typical caster assembly such as one attached to the leg of a chair, a load-supporting base member secured to the base of the leg has projecting therefrom a vertical axle oh which one end of a swivel frame is pivoted. Mounted below the other end of the frame is a ground-engaging caster wheel rotatable on a horizontal axle.

When a chair which has attached to each of its legs a conventional caster assembly, each caster wheel swivels about a vertical axle projecting from the leg of the chair to assume an orientation in which the horizontal axis of rotation of the wheels is normal to the chosen direction of chair movement. Hence as the chair advances in the chosen direction, the caster wheels on the legs rotate freely.

The quick angular re-alignment of the caster wheels with the direction of movement which takes place as the direction is changed not only makes possible swift transportation of the load but also prolongs the effective life of the caster wheels.

As noted in U.S. Pat. No. 4,254,532 to Hager in which is disclosed a caster assembly, the axis of each caster wheel is necessarily offset horizontally from the swivel axis in order to cause the caster to trail properly. As a consequence, the caster-assembly is vulnerable to impact forces. Thus when the ground-engaging wheel of the assembly is traveling at a fast speed and it strikes an obstruction in its path, the resultant impact force may break the caster.

In order to reduce stresses imposed on the caster bracket or swivel frame when the caster strikes an obstruction, and to avoid injury to the caster, Hager interposes a support roller between the swivel frame and the load at a point spaced radially outwardly from the swivel axis.

A standard caster assembly is designed by its manufacturer to operate efficiently when the load it bears is no greater than a predetermined value. Hence a caster assembly is given a load rating by its manufacturer. Casters intended for a baggage truck are designed to safely support a load for which its wheels are rated. But as is often the case, when the truck in use is overloaded with baggage, the caster assembly may be incapable of surviving this excessive load.

The concern of the present invention is with the ability of a caster assembly whose wheels are substantially the same as those in a standard caster assembly to withstand loads and impact forces that the standard assembly cannot tolerate.

As noted in PCT Publication WO 01/38201, in a castor assembly in which a castor wheel is mounted on a swivel, the axle of the caster is horizontally offset with respect to the axis of the swivel. This creates a moment of force that may be of sufficient strength to break the vertical axle on which the castor swivel is pivoted.

The moment of force is the result of the force produced by a load multiplied by its perpendicular distance from a point of turning. A moment of force is equivalent to a torque which gives rise to torsion. In the context of a caster assembly, this torsion may twist and break the swivel axle and, in doing so disable the assembly.

When the load borne by a castor assembly is close to or exceeds its load rating, then with a conventional caster assembly the resultant high moment of force may be powerful enough to disable the assembly. To reduce the moment of force assembly disclosed in the above-identified PCT publication, includes at least one support roller that is interposed between the pivoted swivel on which a caster wheel is mounted and the load imposed on the swivel. While this PCT arrangement does reduce the moment of force, it does not fully cancel it out so that the caster assembly is capable of tolerating very heavy loads.

Moreover, the support roller in the PCT publication interposed between the swivel and a base member supporting the load, lengthens the overall height of the assembly so that its height is significantly greater than that of a standard caster assembly which lacks a support wheel. The ideal caster assembly is one whose swivel is inclose proximity to a base member supporting the load so as to raise the load above ground no more than necessary to accommodate the ground-engaging caster wheel.

Also of prior art interest is U.S. Pat. No. 4,509,227 to Keane which discloses a swivel caster structure in which a caster wheel is carried on a base. A roller functioning as a force transfer agent is carried by the base for transmitting an overlying load (in this case a vacuum cleaner) vertically downward toward the caster wheel away from the swivel axis in order to improve the effective life of the structure.

SUMMARY OF THE INVENTION

In view of the foregoing, the main object of this invention is to provide an improved caster assembly in which a caster which is swiveled from a vertical axle projecting below a base member supporting the load, the assembly including at least one support roller interposed between the swivel and the base member to protect the assembly from adverse effects resulting from an excessive load or impact forces.

More particularly, an object of this invention is to provide a caster assembly in which a frame on which is mounted a caster wheel is pivoted from a vertical axle, the frame has mounted thereon a pair of support rollers which are symmetrically disposed with respect to the vertical axle and to the caster wheel, the arrangement being such as to cancel out the moment of force and to enhance the resistance of the assembly to the adverse effects of an excessive load and impact forces.

A significant feature of the invention is that the overall height of the assembly is not much greater or no greater than that of a standard assembly having a like caster wheel, for in an assembly in accordance with the invention, the load-support rollers are nested in wells or recesses formed in the swivel frame so that only the uppermost segment of each roller is raised above the frame to engage the load.

Briefly stated these objects are attained in a castor assembly for supporting a load such as an article of furniture so that it can easily be moved in any desired direction. The assembly includes a load-bearing base member from which a vertical axle is projected which pivots a swivel frame. Mounted on the frame is a ground-engaging caster wheel having a horizontal axle. Also mounted on the swivel frame is at least one support roller which engages the base member to support the load imposed therein. The position of the roller relative to the caster wheel is such as to cancel out the moment of force between the vertical axle and the caster wheel, thereby protecting the assembly from the adverse effects of an excessive load and of impact forces.

In a preferred embodiment of the invention, the swivel frame is generally triangular in form and is pivoted at its apex on the vertical axle projecting below the load-bearing base member. The caster wheel is mounted below the frame adjacent its rear end midway between its corners on a central axis that extends to the pivot point. Hence when the frame is turned, the caster wheel is movable in a circular orbit whose center is the pivot point. A pair of load-supporting rollers are mounted adjacent the respective rear corners of the triangular frame on either side of its central axis and symmetrically with respect to the caster wheel. Hence, the rollers are movable in a circular orbit which is concentric with and adjacent to the main caster wheel orbit to provide a common line of action.

BRIEF DESCRIPTION OF THE DRAWINGS

For a better understanding of the invention as well as other objects and features thereof reference is made to the annexed drawings wherein.

DETAILED DESCRIPTION OF THE INVENTION

All embodiments of a caster assembly in accordance with the invention are adapted to support a load, such as a baggage truck, a chair or a desk so that it can easily be moved in any desired direction. The assembly includes a load bearing base member which is attachable to the load and has a vertical axle projecting therefrom. This axle functions as a pivot for a swivel frame having a caster wheel which swivels on the base member which bears the load. Thus as the load is pushed in a desired direction, the caster wheel is swiveled into alignment with this direction.

Figure 1:
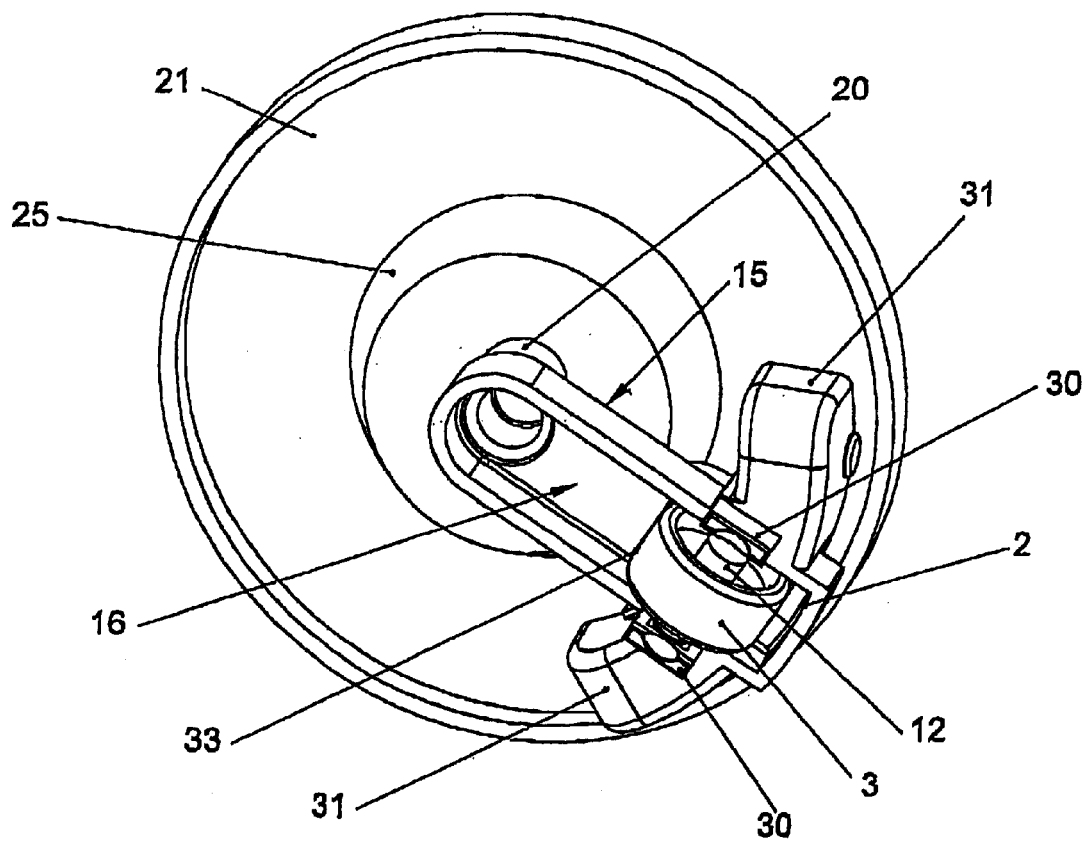
FIG. 1 is an isometric view of a caster assembly seen upside-down, having a pair of support rollers, in accordance with a first preferred embodiment of the invention.

First Embodiment: FIG. 1 illustrates a caster assembly in accordance with the invention in which the swivel frame is a horizontal bar 2 having top and bottom sides 15 and 16, respectively. Horizontal bar 2 is provided at one end with an axle 20 which projects vertically from the top side 15 of the bar 2 and engages a load-bearing member 21 attachable to the load. The bar 2 turns freely about axle 20 and is also free to a limited degree to vertically slide up and down, being prevented, however, from disengaging from the load-bearing member completely. The load-bearing member 21 is preferably provided with a cup-like protrusion 25, so as to shorten the required length of vertical axle 20, thus reducing the moment experienced by the axle 20.

Supported at the other end of horizontal bar 2 is a caster wheel 3. Wheel 3 is received within a cavity 33 formed in the bar 2 and it partially protrudes downwardly from the bar 2 to engage the ground. Axle 12 of caster wheel 3 is supported on its ends by matching carriers 30 on the bar 2.

Figure 2:
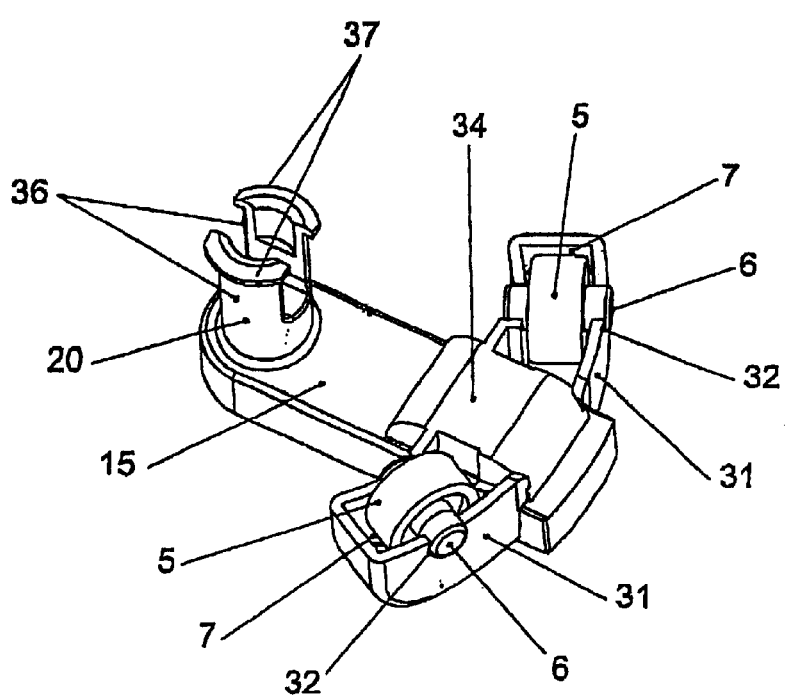
FIG. 2 is an elevated view of the assembly shown in FIG. 1 detached from the load-bearing member included in the assembly.

FIG. 2 is an upside down elevated view of the caster assembly shown in FIG. 1, in which the horizontal bar 2, composing the swivel frame is detached from the load-bearing member 21. Bar 2 is provided with arcuate extensions or wings 31. Each of these wings 31 carries at its end a support roller 5, which is partially sunken in a cavity 7 and protrude therefrom. The axis of rotation of each support roller 5 is aligned radially with respect to vertical axle 20, this being the axis of rotation of the pivoted swivel frame.

Axle 6 of each support roller 5 is snapped into position inside matching sockets 32 on the side walls of each cavity 7. A protrusion 34, which in fact is the wall of cavity 33 shown in FIG. 1, bulges out from bar 2. But it does not interfere with the smooth operation of the swivel, for it is comfortably accommodated between the support rollers 5. However, this protrusion 34 must be below the support rollers 5 so that they can come in contact with the load-bearing surface.

The arrangement of support rollers 5 is in an arcuate formation to allow swivel bar 2 to comfortably turn about vertical axle 20, thereby facilitating a smooth ride. This is achieved because the axis of rotation of support rollers 5 is aligned radially to the vertical axis of rotation of the bar 2.

Vertical axle 20 is provided with a pair of opposing resilient flaps 36, each having a rim 37 so that they can be snapped into a bore provided on the load-bearing member 21 and remain engaged thereby. However, in practice, other methods of engagement of the vertical axle 20 to the load-bearing surface may be used. And, instead of the vertical axle 20 being projected upwardly from the swivel frame to engage the load bearing member 21, it can be projected downwardly from the load bearing member to engage the swivel frame. In practice, vertical axle 20 may be provided with a double-action snap.

Figure 3:
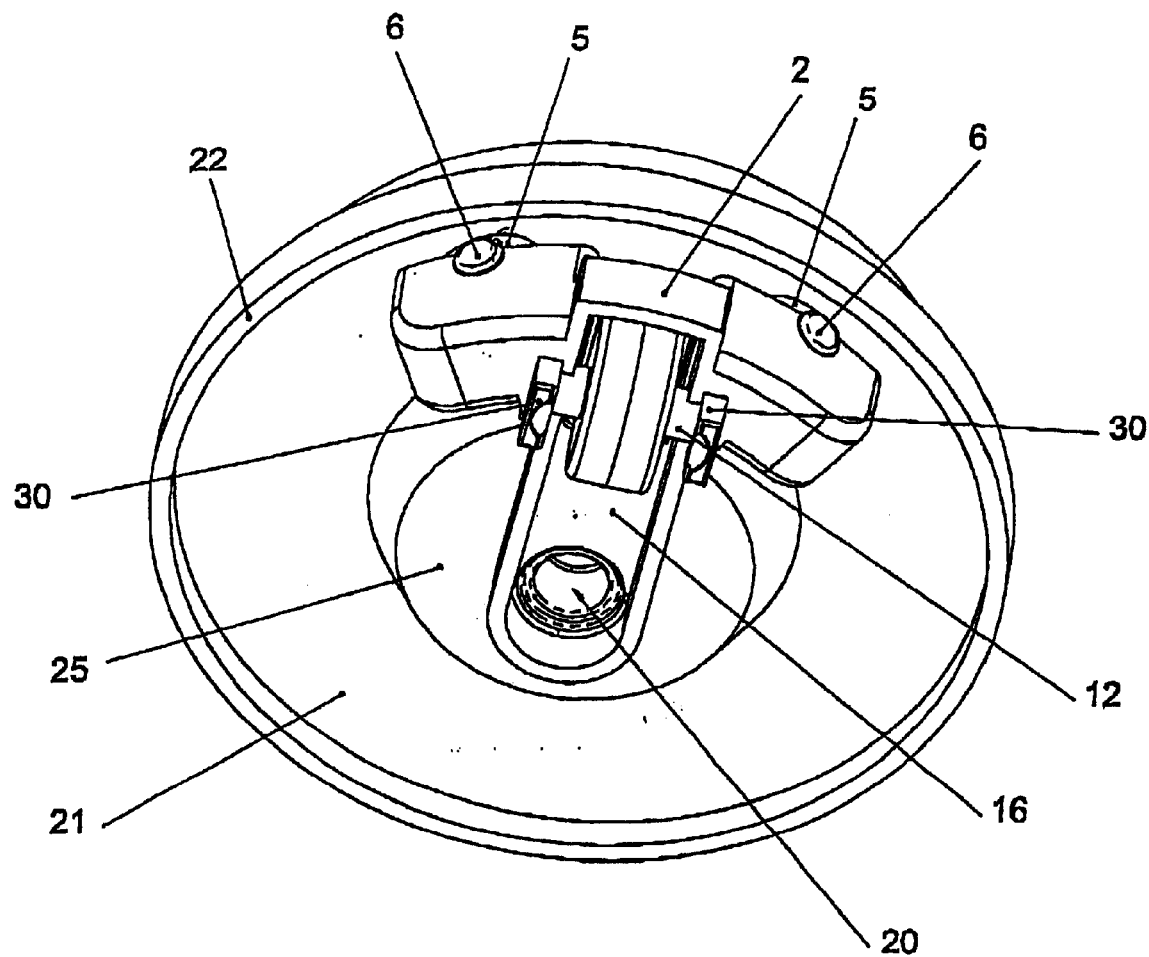
FIG. 3 presents another isometric view of the caster wheel assembly.

FIG. 3 is another isometric view of the swivel frame, shown in FIG. 1. The bottom surface 21 of the load-bearing member 21 is preferably a planar surface so that it presents no obstacle to swiveling of the swivel frame. It may also be provided with a clearly defined track to provide a circular path for the support rollers. An annular rim 22 surrounding this track provides protection against inadvertent jamming caused by external obstacles.

A swivel assembly in accordance with the present invention is of particular appeal to the plastics industry in that its components may be molded from plastic materials, such as POM, polyamide, polypropylene, and the like. The caster assembly can therefore be fabricated to have a light weight, this being another advantage of the invention. In practice, however, the assembly may be made of lightweight aluminum or heavier steel or stainless steel.

Load support rollers 5 provide supporting points for the load which release the vertical axle 20 from the moment of force to which it is subjected by the load-bearing member 21. The support rollers 5 are positioned so that the imaginary arc tangent to their planes of rotation is not tangential to the axis of rotation of the caster wheel 3, for this may cause the support rollers 5 to flap and give rise to a jittery motion due to an unstable balance of the forces acting on the rollers 5. While only one caster wheel 3 is included in this embodiment, it is possible to have two or more caster wheels supported below horizontal bar 2, provided that they are in proper alignment.

Second Embodiment: In the caster assembly shown in FIGS. 4, 5 and 6, a swivel frame 50 is swingable on a vertical axle 51 functioning as a pivot. Axle 51 projects downwardly from a load-supporting member 52 attached to the base of a load 53 such as baggage truck or the leg of a desk. Obviously the dimensions of the caster assembly and its structural strength must be appropriate to the nature of the load 53.

Figure 6:
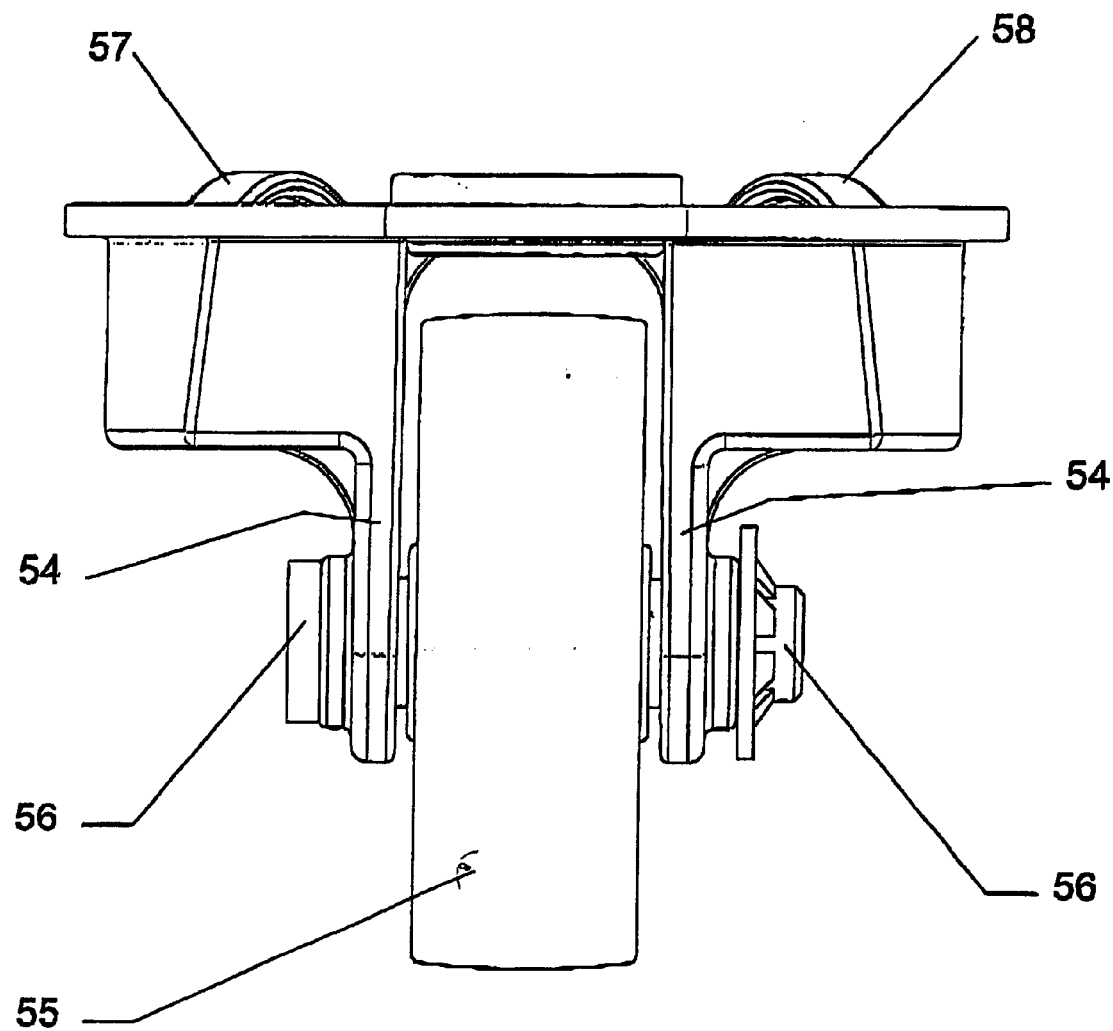
FIG. 6 illustrates the fork supporting the caster wheel in the second embodiment.

Swivel frame 50, which has a generally triangular form, is provided at its apex with a socket for receiving vertical axle 51 which functions as the pivot on which the frame 50 swivels. Supported on this triangular frame 50 below its rear end is a caster wheel 55 mounted on a fork having parallel arms 54 which embrace opposite ends of the horizontal axle 56 of caster wheel 55, as best seen in FIG. 6.

In this fork arrangement, the parallel arms 54 projecting from the frame 50 are vertical and at right angles to the frame 50 to which it is attached. The fork is therefore exposed mainly to compressive forces, for only a minor moment of force is applied to the arms 54 of the fork.

Integral with the rear end of the triangular swivel frame 50 and coplanar therewith is a U-shaped extension 50E whose parallel branches B1 and B2 are joined to the corners of the frame 50 at its rear end. The central axis X of the frame 50 which runs from the pivot point at the apex of the frame 50 to a point midway between parallel branches B1 and B2, acts as an axis of symmetry between a pair of load-support rollers 57 and 58 mounted for rotation on these branches B1, B2. The horizontal axles on which rollers 57 and 58 are supported are in alignment with radial axes Y and Z extending from the pivot point on either side of the central axis X.

Hence when the swivel frame 50 swings on its pivot, rollers 57 and 58 then travel in a circular orbit O1 whose dead center is the pivot point. And, when the load 53 is pushed and the swivel frame 50 swings to align its caster wheel 55 with the direction of movement, the caster wheel 55 then travels in a circular orbit O2 which is concentric with orbit O1 and close thereto. Thus the caster wheel 55 is on a common line of action with the pair of support rollers 57, 58 symmetrically disposed with respect to the caster wheel 55. Hence the caster wheel 55 and rollers 57, 58 are in a balanced, symmetrical arrangement on the frame 50.

The benefit gained by this balanced arrangement on the swivel frame 50 is that whereas in the assembly without support rollers 57, 58, the resultant moment of force may be great enough to disable the caster assembly, with support rollers 57, 58 included in the assembly, the moment of forced is effectively cancelled out and the caster assembly is capable of handling heavier loads 53 without becoming disabled. And the caster assembly is shock resistant, for should the caster wheel 55 strike an obstruction, the resultant impact force, by way of the support rollers, would be absorbed by the load 53.

Should the caster assembly lack the support rollers 57, 58, then when the load 53 is being pushed at a fast pace, the weight of the load 53 may be such as to cause the caster assembly to collapse. This may have serious consequences should it cause the load to topple.

Third Embodiment: The caster assembly illustrated in FIG. 7 is a small scale version of the assembly shown in FIG. 4 and is appropriate for attachment to relatively light weight articles such as chairs.

Figure 7:
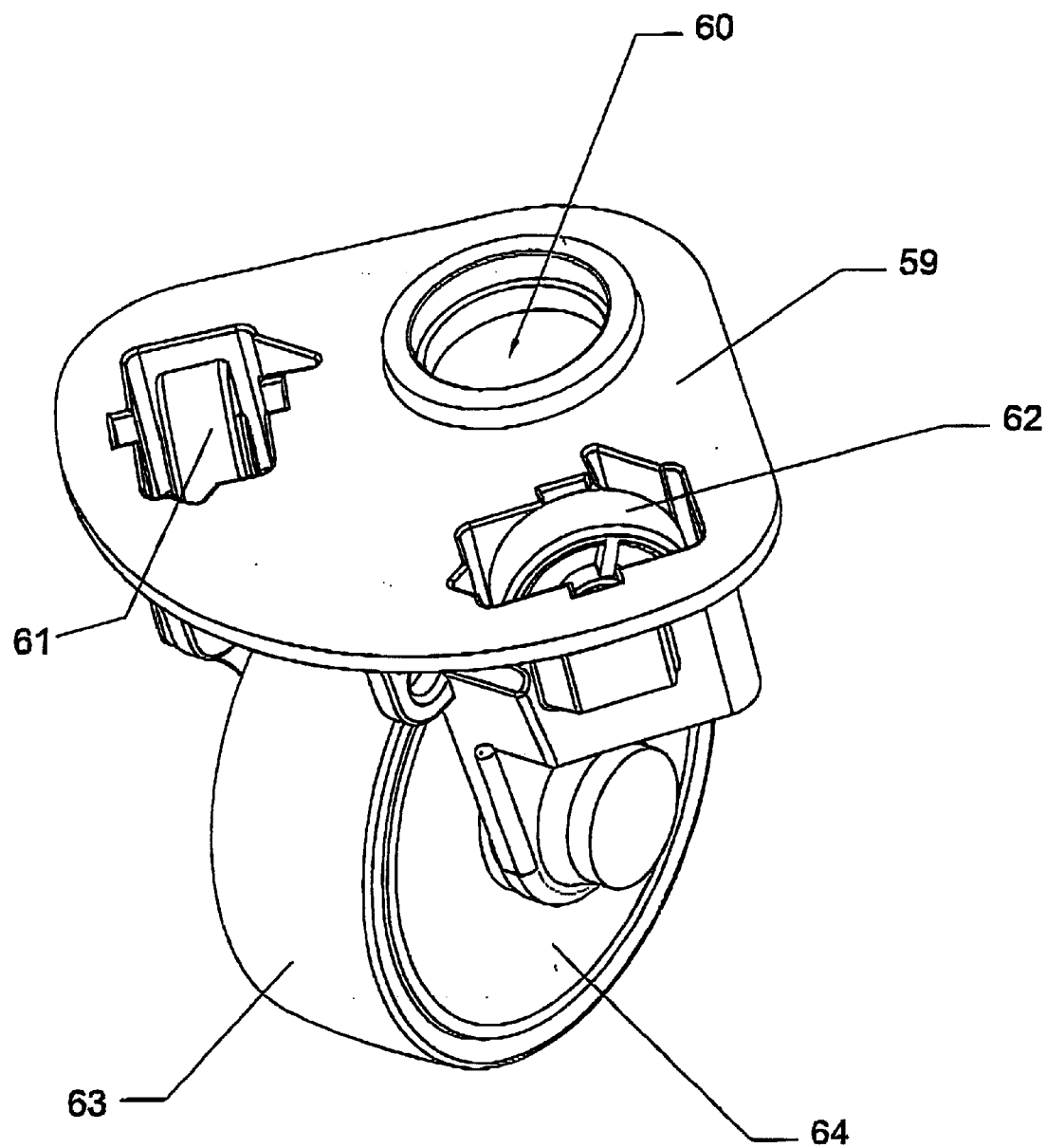
FIG. 7 is a perspective view of a third embodiment of a caster assembly in accordance with the invention.

The swivel frame 59 shown in FIG. 7 has the shape of an equilateral triangle having rounded corners which lends itself to being combined with a circular load-bearing member such as that shown in FIG. 3 having a circular rim which is swept by the corners of the frame as it is being swiveled. The rim in this case protects the swivel frame from impact forces.

Swivel frame 59 is provided adjacent one corner with a socket 60 adapted to receive a vertical axle projecting from a load-support member which acts to pivot the frame 59. Nested in wells adjacent the other two corners of the frame 59 are load-support rollers 61 and 62, while attached to the underside of the frame is a caster wheel 63.

It will be seen that it is only the upper segment of the rollers that project above frame 59 to engage the load bearing member. Hence the overall height of the assembly is not much greater than that of an assembly without rollers.

Figure 4:
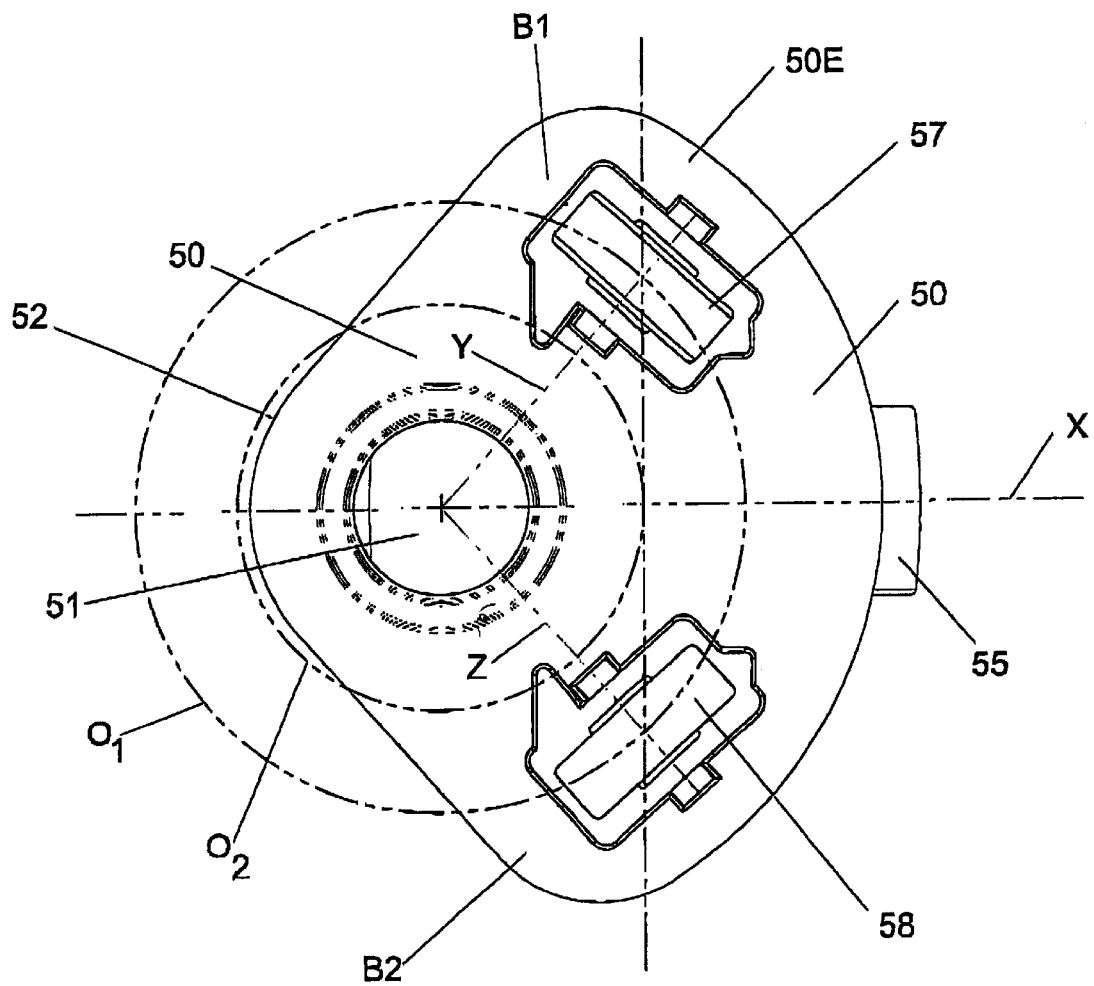
FIG. 4 is a plan view of a second embodiment of a caster assembly in accordance with the invention.
Figure 5:
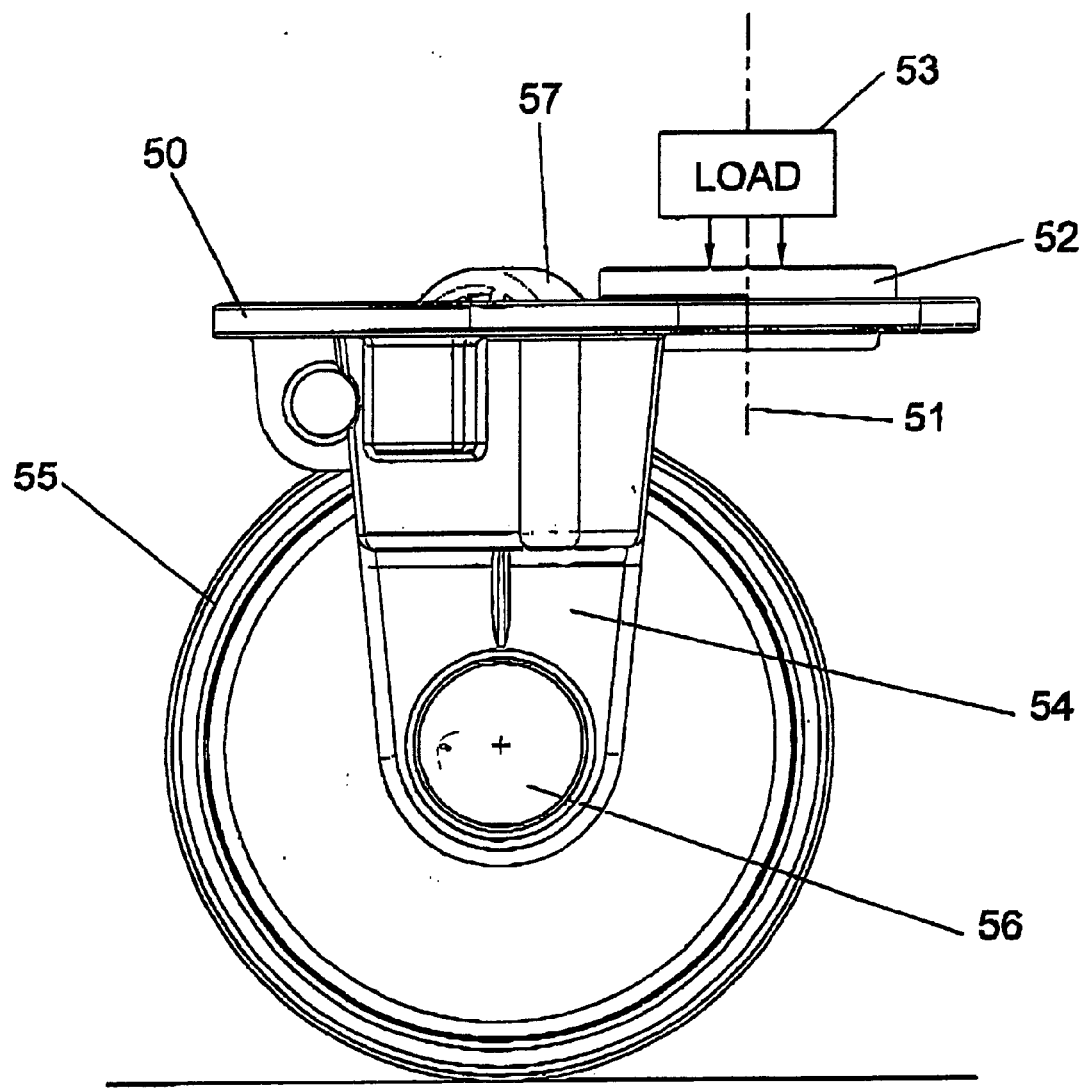
FIG. 5 is a side view of the second embodiment.

The balanced symmetry of this arrangement is the same as that of the caster assembly shown in FIG. 4 and has the same advantages, for it results in the cancellation of the moment of force.

In practice rubber or polymer O-rings may be installed on the rollers and on the load-bearing member to reduce noise and shock. When, as in FIG. 3, the swivel frame is turnable within a cylindrical casing, the casing may be provided with a circular cover to prevent dust and water from entering the casing to contaminate the swivel assembly.

Because of the balanced, symmetrical arrangement of the rollers 61, 62 and the caster wheel 64, the caster is resistant to shock forces imposed on its sides.

While there have been shown preferred embodiments of the invention, it is to be understood that many changes may be made therein without departing from the spirit and concept underlying the invention. For example, instead of support rollers nested in recesses in the swivel frame in the symmetrical arrangement shown in FIG. 7, arcuate slides may be used for the same purpose to slide rather than roll on the undersurface of the base member.

What is claimed is:

1. A caster assembly for supporting a load so that it is easily movable in a desired direction, said assembly comprising:

A. a load-bearing base member attached to a load at its base;

B. a vertical axle projecting downwardly from the base member to provide a pivot;

C. a swivel frame pivoted on the axle having mounted thereon a ground-engaging caster wheel whereby when the load is moved in a desired direction, the wheel is then swiveled to bring it into alignment with said direction, the wheel being movable by the swiveled frame in a circular orbit whose center is the pivot;

D. at least one support roller mounted on the frame to engage the base member and to support the load imposed therein, the roller being movable by the frame in a circular orbit concentric with the wheel orbit and close thereto, whereby the load is borne mainly by the roller and the resultant moment of force is minimal to render the assembly capable without becoming disabled;

in which the frame has a triangular form and is provided with a U-shaped extension having parallel branches integral with rear corners of the triangle, a pair of support rollers being mounted on the respective branches.

2. A caster assembly for supporting a load so that it is easily movable in a desired direction, said assembly comprising:

A. a load-bearing base member attached to a load at its base;

B. a vertical axle projecting downwardly from the base member to provide a pivot;

C. a swivel frame pivoted on the axle having mounted thereon a ground-engaging caster wheel whereby when the load is moved in a desired direction, the wheel is then swiveled to bring it into alignment with said direction, the wheel being movable by the swiveled frame in a circular orbit whose center is the pivot;

D. at least one support roller mounted on the frame to engage the base member and to support the load imposed therein the roller being movable by the frame in a circular orbit concentric with the wheel orbit and close thereto, whereby the load is borne mainly by the roller and the resultant moment of force is minimal to render the assembly capable of carrying a heavy load and to resist impact forces without becoming disabled;

in which said frame has a lateral arcuate extension, and wherein said caster wheel is mounted in a cavity in said extension.

3. A caster assembly for supporting a load so that it is easily movable in a desired direction, said assembly comprising:

a) a load-bearing base member attached to a load at its base;

b) a vertical axle projecting downwardly from the base member to provide a pivot;

c) a swivel frame which is pivotally mounted on the axle and carries a ground-engaging caster wheel whereby when the load is moved in a desired direction, the wheel is then able to swivel together with the swivel frame to be brought into alignment with the desired direction, the wheel being displaceable by the swivel frame along a first circular orbit, wherein said vertical axle passes through a center of the first circular orbit;

d) at least a first and a second support roller mounted on the swivel frame with possibility to engage the base member and to support the load imposed thereon, the first and the second support roller is disposed symmetrically with respect to a longitudinal middle plane of the caster wheel, the first and the second support roller is displaceable by the swivel frame so as to roll about a horizontal rolling axis along a second circular orbit, which is concentric with the first circular orbit, whereby the first and the second support roller has a roller longitudinal middle plane, wherein the first and second support roller is located in such a manner with respect to the longitudinal middle plane of the caster wheel that during displacement along the second circular orbit the roller longitudinal middle plane remains directed tangentially with respect to the second circular orbit, the arrangement being such that the load is borne mainly by the first and the second support roller and the resultant moment of force applied to the vertical axle is reduced to a minimum to render the assembly capable of carrying a heavy load and to resist forces without becoming disabled.

4. An assembly as set forth in claim 3 in which said rolling axis is perpendicular to the vertical axel.

5. An assembly as set forth in claim 4, in which the caster wheel is attached to the swivel frame by a fork, said fork having parallel arms, which are bridged by a horizontal axle supporting the caster wheel.

6. An assembly as set forth in claim 4, in which the first and the second support roller is nested in a corresponding well provided in the swivel frame so that only a roller's upper segment projects above the swivel frame to engage the base member.

7. An assembly as set forth in claim 4, in which the base member, the swivel frame, the caster wheel and the first and second support roller are each formed of synthetic plastic material.

8. An assembly as set forth in claim 4, in which the caster wheel is aligned with a central axis extending the pivot through the center of the swivel frame, and the first and the second support roller is aligned with radical axes extending from the pivot on either side of the longitudinal middle plane of the caster wheel.

9. An assembly as set forth in claim 8, in which the swivel frame has a generally triangular form and the pivot is located adjacent the apex of the triangle, the first and the second support roller being respectively adjacent the respective base corner of the triangle.

10. An assembly as set forth in claim 3, in which the swivel frame has a triangular form and is provided with a U-shaped extension having parallel branches integral with the base corners of the triangle, the first and the second support roller being mounted on the respective branch.

11. An assembly as set forth in claim 3 in which the caster wheel is mounted on a horizontal axle that is snapped into position in the swivel frame.

12. As assembly as set forth in claim 3 in which said swivel frame has a lateral arcuate extension, and wherein said caster wheel is mounted in a cavity on said extension.

13. An assembly as set forth in claim 3, wherein said vertical axle is provided with two opposing resilient flaps each having an end run, which is snappable into a bore in said load-bearing base member.

14. An assembly as set forth in claim 3, wherein said load-bearing base member is provided with a round protrusion so as to shorten the required length of said vertical axle, thereby reducing the moment experienced by said axle.

15. An assembly as claims in claim 3, wherein said load-bearing base member is further provided with an annular rim serving as a protective barrier against inadvertant jamming by external obstacles.

* * * * *

UNITED STATES PATENT AND TRADEMARK OFFICE
CERTIFICATE OF CORRECTION

PATENT NO.   : 6,760,953 B2
DATED        : July 13, 2004
INVENTOR(S)  : Ben-Meir It is certified that error appears in the above-identified patent and that said Letters Patent is hereby corrected as shown below:

Column 6,
Line 53, after "capable" insert -- of carrying a heavy load and to resist impact forces --.

Signed and Sealed this

Twenty-second Day of February, 2005

JON W. DUDAS
*Director of the United States Patent and Trademark Office*